[15] 3,639,738

Laukien
[45] Feb. 1, 1972

[54] METHOD AND DEVICE FOR RECORDING SPECTRA

[72] Inventor: Günther R. Laukien, Am Silberstreifen, Karlsruhe-Forchheim, Germany

[22] Filed: Oct. 30, 1969

[21] Appl. No.: 872,712

[30] Foreign Application Priority Data

Nov. 2, 1968 Germany .......................P 18 06 615.5

[52] U.S. Cl. .......................235/151.35, 324/0.5, 324/77 CS
[51] Int. Cl. .........................................................G01d 1/14
[58] Field of Search....................235/151.35; 324/0.5, 77 CS

[56] References Cited

UNITED STATES PATENTS 3,297,860   1/1967   Weiss..................................235/151.35
3,484,591   12/1969   Trimble................................324/77 CS

*Primary Examiner*—Eugene G. Botz
*Attorney*—Craig, Antonelli and Hill

[57] ABSTRACT

An arrangement for controlling the scan of a spectrometer employs a computer and associated equipment for initiating one complete scan of the spectrometer. During this scan where partial ranges of signal values are detected, said ranges being of particular interest, repeated scans of these ranges occurs until a sufficient number to provide useful information is obtained and, thereupon, the continuous scan of the spectrometer is continued. The equipment employed includes address registers and comparison circuitry for indicating and storing the addresses of those signal values which the computer has selected after a determination has been made that a partial range exists. Where signal values far exceed the threshold value which defines a partial range, no repeated scanning is employed or is necessary.

19 Claims, 1 Drawing Figure

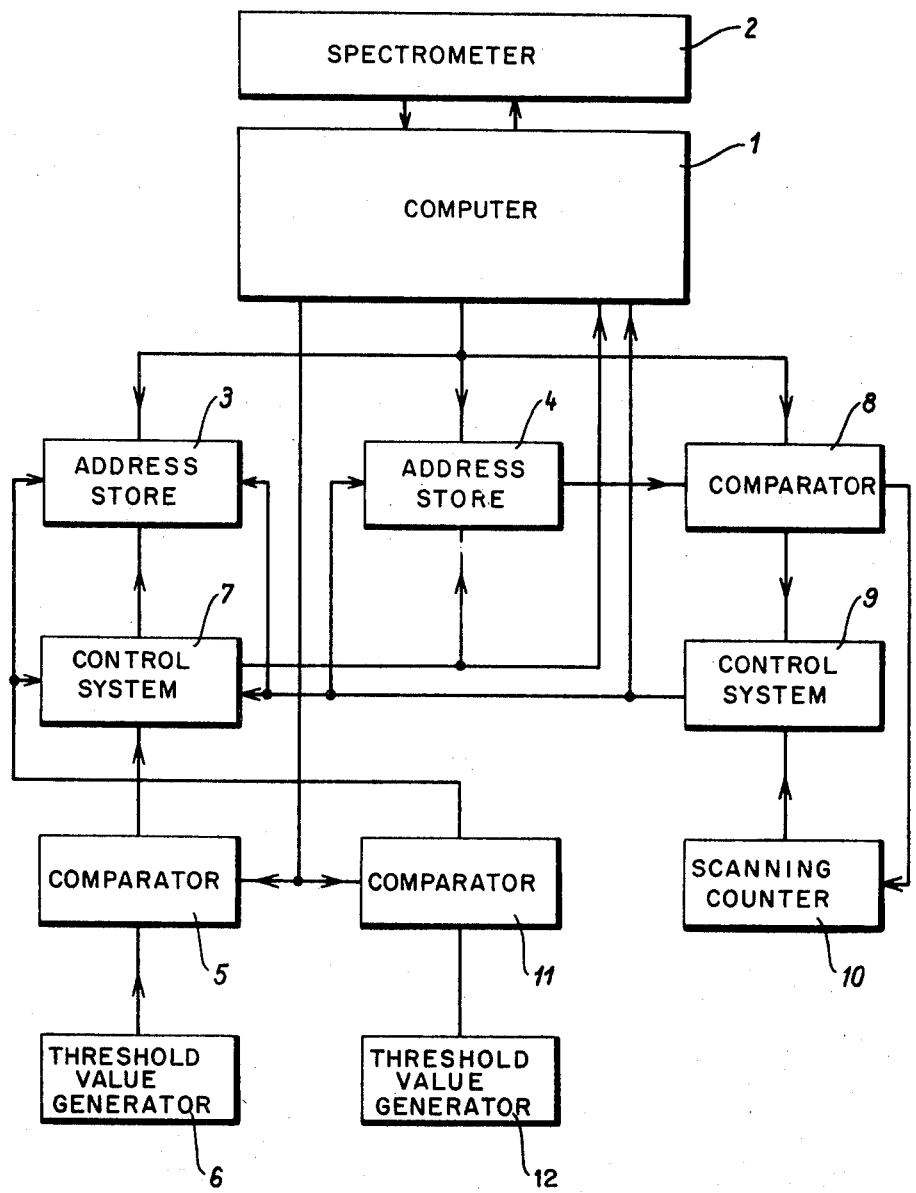

METHOD AND DEVICE FOR RECORDING SPECTRA

The present invention relates to a method for recording spectra, in which ranges of interest of the spectrum are covered several times in succession and where an average is taken from the values measured.

It is known that the lines of a spectrum the signal amplitude of which is of the order of the noise amplitude can be lifted out of the noise, by a sort of correlation, by scanning the spectrum several times in succession, so that the amplitudes of the exactly coinciding line signals are cumulated, whereas such cumulation occurs with noncoherent noise signals only proportional to the square root, so that an important increase in the distance between signal and noise amplitudes is possible. So far the whole of the recorded spectrum has always had to be covered again, so that even such areas of the spectrum were scanned several times where there were definitely no signals or where there were signals which were clearly distinguishable from the noise level. At best it was possible to first record a total spectrum and subsequently to investigate it for places having spectral lines in the noise range or slightly distinguishable from the noise level. Then these points obtained by analysis of the spectrum could be scanned individually. The total spectrum in this case was limited to the places of interest. However, in this case, too, the total spectrum was repeated, even when the total spectrum was limited to a portion of interest of a major range.

The known methods for recording spectra, in which the ranges of interest of the spectrum were covered several times in succession, therefore, were very complicated and time-consuming. The present invention is based on the task of providing a method which permits a simpler and more rapid recording of spectra without affecting the precision thereof and without skipping any lines within the range of the noise level.

According to the present invention, this problem is solved by scanning all of the spectrum only once and in a single operation and by covering several times in succession the ranges of interest within this total spectrum as partial ranges, before scanning is continued. It may be useful to arrange for intervals between repeated scannings of the partial ranges, when the relaxation of the spin system requires time due to the preceding measuring disturbance.

The method which is the subject of the present invention thus avoids repeated scanning also of those ranges of the spectrum which positively do not include any lines or where the signal amplitudes are far above the noise level, and it thus avoids wasting of considerable time. Moreover it is not necessary first to scan all of the spectrum and then to set the spectrometer to one or several partial ranges of major interest. Rather, a uniform spectrum is recorded without interruption, but, in the course of this recording operation, this or that range of interest is covered several times so that a very precise spectrum can be recorded in a minimum of time and with a minimum of work.

In one embodiment of the method which is the subject of the present invention the partial ranges to be covered several times can be preselected. Such preselection may, for example, be advisable, when in analyzing a material it is to be established whether or not a certain line is present. The existence or absence of this line can be established by repeated coverage of the partial range in which such line, if any, is located, even if it is within the noise range.

In other applications it may be more practical to determine the partial ranges which are to be covered several times, on the basis of the signal amplitude. The determination of the partial ranges on the basis of the signal amplitude may, for example, be effected in such a manner that multicoverage is preset to occur within the limits at which the signal amplitude exceeds, and drops underneath, a preselected threshold value. To avoid that in this manner also those partial ranges are scanned several times in which the signal amplitude has a peak value far above the noise level, scanning may be caused to be repeated only on the condition that the signal amplitude, within a certain frequency interval after exceeding the preselected threshold value, fails to exceed a second threshold value, and thus remains below this second threshold value. It is of advantage to set the threshold value just slightly above the noise level to make sure that repeated scanning will occur when the average noise level is slightly exceeded to suggest the presence of a spectral line at this place.

Obviously, some partial ranges of a spectrum to be scanned can be preselected while at the same time others can be determined on the basis of the signal amplitude.

The present invention also relates to a device for accomplishing the method which is the subject of the present invention. It is based on a device using a computer for the control of step-by-step scanning of the spectrum and for storing and reducing to a mean the signal amplitudes associated with the scanning places marked by addresses. Such devices are known for instance from core resonance spectrographs and mass spectrographs. The method which is the subject of the present invention and the arrangement in accordance with the present invention also are intended primarily for spectrographs of the said type. According to the invention, a first comparator, a first address memory and a second address memory may be coupled to the computer, and the first address memory, on a signal from the comparator, stores the address as supplied by the computer of the scanning place where the signal amplitude reaches a first threshold value, as indicated in the comparators, whereas the second address memory stores the address of the scanning place where the signal amplitude again drops below the first threshold value. Connected to the two address memories there is a control means which causes repeated scanning of the spectrum between the two stored addresses.

In a preferred embodiment of the present invention, the control means comprises a second comparator where the address stored in the second address memory is compared with the addresses supplied by the computer and which, in the case of agreement, supplies control signals to a scanning counter which is connected to a control system which causes repetition of the scanning of the range of interest of the spectrum, until a preselected condition is obtained in the scanning counter.

In a preferred embodiment of the invention, a third comparator is provided in which the signal amplitude is compared with a second, higher threshold value and which, when the threshold value is exceeded, causes the addresses in the first address memory to be erased and the device to be restored to its rest condition. Accordingly this third comparator prevents repeated scanning of a range where the signal amplitude reaches a certain peak value.

For further details and embodiments of the present invention, reference is made to the following detailed description and explanation of the invention on the basis of the embodiment shown on the drawing. The drawing shows the block diagram of a device in accordance with the invention.

The device shown in the drawing comprises a computer 1 which in a known manner is coupled to a spectrometer 2 and which causes the spectrometer 2 to scan step by step the spectrum to be analyzed. For example computer 1, in the case of a core resonance spectrometer, can cause a step-by-step adjustment of the excitation frequency and allocate to each individual frequency an address where the signal received by the spectrometer is stored. Further, the computer may, in a manner actually known and therefore not explained in detail, contain means for forming a mean value, which, on repeated scanning of the spectrum, will add up, and process as required, the signals associated with the same address, for instance by reduction to the arithmetic or geometric mean.

Connected to the computer are two address stores 3 and 4 and a first comparator 5. The comparator is supplied with the signal amplitudes associated with the addresses which are fed to the address memories 3 and 4. In comparator 5, the signal amplitude is compared with a first threshold value supplied by a threshold value generator 6. This threshold value is adjustable and is selected to ensure that it is located just above the mean noise level. When the signal amplitude reaches the threshold value preselected in threshold-value generator 6, comparator 5 supplies a signal to a control system 7 which causes the first address memory 3 to store the address associated with the place where the signal amplitude has reached the preselected threshold value. If, afterwards, the signal amplitude again drops below the preselected threshold value, which is established by means of comparator 5, the control system 7 connected to the comparator furnishes another signal which causes the second address memory 4 to store the address of the signal where the signal amplitude has again dropped below the threshold value setting of the threshold generator 6. By means of the two address memories 3 and 4 one has thus automatically established the limits of a partial range of the spectrum where the signal amplitude exceeds a preselected threshold value and drops below it again and which has to be scanned several times to find whether or not there is a real signal.

For renewed coverage of range defined by the addresses in address memories 3 and 4, the control system 7, together with the command to store an address, as directed to address memory 4, another command to return to address 3 and to repeat scanning from there is supplied to computer 1.

To enable repetition of this return, a second comparator 8 is provided, to which the addresses formed by the computer are supplied, so that they are compared with the address in the second address memory. In the case of agreement of the two addresses, a control means 9 connected to the second comparator 8 receives a signal which in turn gives a return order to the computer. Furthermore, in the case of agreement of the addresses in comparator 8, a signal is supplied to scanning counter 10. Once the number of repeated scannings has reached a figure previously fed into the scanning counter, the scanning counter produces a signal which it supplies to control means 9 and which causes the control means to reset the address memories 3 and 4 and the control means 7 connected to it, so that, after the last repetition, no address will be supplied to comparator 8 from the second address memory, and no return signal will be triggered as a result. It follows that after the number of repetitions of a partial range defined by scanning counter 10, the scanning of the spectrum is continued.

To avoid repeated scanning of a partial range, when the signal amplitude between the two address memories 3 and 4 rises to a high value, precluding the necessity of repeated scannings of the spectrum, a third comparator 11 is provided to which is supplied the signal amplitude by computer 1 and the threshold value by a second threshold value generator 12, which threshold value is higher than the threshold value defining the limits of the range to be covered again. Once the signal amplitude reaches the threshold value supplied by the second threshold-value generator 12 to comparator 11, comparator 11 supplies to the first address memory 3 and to the control mean 7 connected therewith a signal which resets both elements to zero.

By means of a simple counting circuit not shown in detail one can ensure that resetting of address memory 3 and of control system 7 by the third comparator 11 is precluded, when the address contained in the first address memory 3 and the address where the third comparator 11 supplies a signal are spaced too far apart. Furthermore the signal of comparator 11 could in this case be used to cause multiple scanning of the range between the address contained in the first address memory 3 and the response of the third comparator 11.

Obviously, the invention is not limited to the practical embodiment described, but will include whatever deviations therefrom are possible without exceeding the scope of the invention. A great number of logical circuits is conceivable by which the method which is the subject of the invention can be accomplished. Furthermore the circuit shown might include components which make it possible to preselect at will partial ranges to be covered several times. Moreover it is conceivable to provide an analog arrangement to replace the digital arrangement shown as an embodiment, if the spectrometer causes continuous scanning of the spectrum.

I claim:

1. A method of recording spectra in which ranges of interest are covered several times in succession and in which the values measured therein are reduced to a means comprising the steps of:
   initiating the scanning of a spectrum of values;
   repeatedly scanning at least one partial range of values within said spectrum a number of times in succession; and
   continuing the scanning of said spectrum subsequent to said repeated scanning of said at least one partial range of values.

2. A method of recording spectra comprising:
   initiating the scanning of a spectrum of the values which may contain at least one partial range of values for which repeated scanning is required;
   continuing said scanning of said spectrum until a partial range of values has been encountered;
   repeatedly scanning an encountered partial range of values a number of times in succession; and
   continuing the scanning of said spectrum until another partial range of values is encountered or until said spectrum is completely scanned.

3. A method in accordance with claim 2, further including the step of preselecting a partial range of values to be repeatedly scanned within said spectrum.

4. A method in accordance with claim 2, further including the step of detecting the extent of each partial range of values as it is encountered during scanning.

5. A method in accordance with claim 4, wherein said step of detecting comprises the step of detecting the amplitudes of the signal within said spectrum.

6. A method in accordance with claim 5, wherein said step of amplitude detecting includes detecting those points within the spectrum at which the signal amplitude rises above and falls below a given threshold value, whereby the extent of a partial range will be defined.

7. A method in accordance with claim 6, wherein said step of repeatedly scanning comprises the step of repeatedly scanning a partial range of values only when the signal amplitudes, withing a certain frequency interval after exceeding said given threshold value, remain below a predetermined threshold value.

8. In a method of recording spectra in which ranges of interest are scanned several times in succession and in which the values measured therein are reduced to a mean value, the improvement comprising the step of:
   scanning the extent of the spectrum only a single time, and wherein said scanning of said spectrum comprises the step of scanning each encountered range of interest forming partial ranges of the overall spectrum several times in succession before the scanning of said spectrum is continued.

9. Device for the recording of spectra comprising a computer for the control of step-by-step scanning of the spectrum and for storing and reducing to a mean the signal amplitudes associated with the scanning places marked by addresses, characterized in that a first comparator, a first address memory and a second address memory are coupled with the computer, the first address memory of which, induced by the comparator, stores the address, as supplied by computer of the place where the signal amplitude reaches a first threshold value fed into the comparator, whereas the second address memory stores the address of the scanning place at which the signal amplitude again drops below the first threshold value, and that a control means is connected to the two address memories which causes multiple scanning of the spectrum between the two stored addresses.

10. Device in accordance with claim 9, characterized in that the control means comprises a second comparator in which the address contained in the second address memory is compared with the addresses supplied by the computer and which in case of agreement feeds control signals to a scanning counter which is connected with a control system which causes repetition of the scanning of the spectrum, until a predetermined setting is reached in the scanning counter.

11. Device in accordance with claim 10, characterized in that a third comparator is provided in which the signal amplitude is compared with a second, higher threshold value and which, when the threshold value is exceeded, causes the address in the first address memory to be erased and the device to be restored to its rest condition.

12. A device for the recording of spectra comprising:
a spectrometer;
first means coupled to said spectrometer, for controlling the scanning of the spectrum;
second means coupled to said first means, for detecting the existence of a partial range of signal values within said spectrum;
third means, coupled to said first means and to said second means, for enabling said first means to repeatedly scan a partial range of values within said spectrum encountered during the scanning thereof; and
fourth means, coupled to said first means and to said third means, and responsive to the completion of said repeated scanning of said partial range of values for causing said first means to continue its scan of spectrum, subsequent to said repeated scan of a partial range of values.

13. A device in accordance with claim 12, wherein said first means comprises a computer for controlling step-by-step scanning of said spectrometer and for storing and reducing to a mean value specific signal amplitudes in said spectrum.

14. A device in accordance with claim 13, further including fifth means coupled to said computer for storing the addresses of specific signals identifying the beginning and end of a partial value range.

15. A device in accordance with claim 14, wherein said second means comprises a first threshold value generator and a first comparator, one input of which is coupled to said first threshold value generator and a second input of which is coupled to said computer to receive signal amplitudes scanned thereby and further includes a first control system for causing said fifth means to store the addresses of that signal, the amplitude of which exceeds the output of said first threshold voltage generator.

16. A device in accordance with claim 15, wherein said second means further includes a second threshold value generator and a second comparator, one input of which is coupled to said second threshold value generator and a second input of which is coupled to said computer to receive signal amplitudes scanned thereby, the output of said second comparator being coupled to said third means and said first control system, for disabling said third means when said signal amplitudes exceed the outputs of said second threshold generator.

17. A device in accordance with claim 16, wherein said third means comprises a third comparator coupled to said computer and said fifth means and a second control system coupled to the output of said third comparator for rescanning a partial range defined by said fifth means and for resetting said fifth means upon completion of the last rescanning of said range.

18. A device in accordance with claim 17, wherein said fourth means comprises a scanning counter coupled to said third comparator and said control system for causing said control system to reset said fifth means upon the completion of a predetermined number of scans of a partial range within said spectrum.

19. A device in accordance with claim 18, wherein said fifth means comprises first and second address storage elements coupled to said computer for storing the addresses defining the extent of a partial range.

* * * * *

UNITED STATES PATENT OFFICE
CERTIFICATE OF CORRECTION

Patent No. 3,639,738     Dated February 1, 1972

Inventor(s) Gunther R. Laukien

It is certified that error appears in the above-identified patent and that said Letters Patent are hereby corrected as shown below:

Page 1, column 1, line 8, " P 1806615.5 " should read

-- P 1806615.4 --

Signed and sealed this 6th day of June 1972.

(SEAL)
Attest:

EDWARD M. FLETCHER, JR.
Attesting Officer

ROBERT GOTTSCHALK
Commissioner of Patents